(12) United States Patent
Hawksworth

(10) Patent No.: US 10,530,233 B2
(45) Date of Patent: Jan. 7, 2020

(54) POLE-PIECE STRUCTURE FOR A MAGNETIC GEAR

(71) Applicant: Goodrich Actuation Systems Limited, Solihull (GB)

(72) Inventor: Andrew Hawksworth, Shropshire (GB)

(73) Assignee: GOODRICH ACTUATION SYSTEMS LIMITED, Shirley, Solihull (GB)

( * ) Notice: Subject to any disclaimer, the term of this patent is extended or adjusted under 35 U.S.C. 154(b) by 126 days.

(21) Appl. No.: 15/198,123

(22) Filed: Jun. 30, 2016

(65) Prior Publication Data

US 2017/0005559 A1     Jan. 5, 2017

(30) Foreign Application Priority Data

Jul. 1, 2015 (EP) .................................... 15275167

(51) Int. Cl.
    *H02K 1/22*         (2006.01)
    *H02K 15/03*       (2006.01)
    *H02K 49/10*       (2006.01)

(52) U.S. Cl.
    CPC ............. *H02K 49/102* (2013.01); *H02K 1/22* (2013.01); *H02K 15/03* (2013.01)

(58) Field of Classification Search
    CPC ...... H02K 49/10; H02K 49/102; H02K 15/02; H02K 15/022; H02K 15/024; H02K 15/026; H02K 15/028; H02K 15/03; H02K 1/18; H02K 1/185; H02K 1/187; H02K 1/28; H02K 1/30; H02K 16/02

USPC ........... 310/103, 216.009, 216.048, 216.136, 310/216.116–216.118, 216.122, 216.133

See application file for complete search history.

(56) References Cited

U.S. PATENT DOCUMENTS

| 5,338,996 | A | 8/1994 | Yamamoto | |
|---|---|---|---|---|
| 2013/0106234 | A1* | 5/2013 | Kagami | H02K 1/2766 310/216.136 |
| 2013/0320795 | A1* | 12/2013 | Enomoto | H02K 49/106 310/103 |
| 2016/0160750 | A1* | 6/2016 | Mueller | H02K 49/102 60/598 |

FOREIGN PATENT DOCUMENTS

| CH | 586585 A5 | 4/1977 | | |
|---|---|---|---|---|
| DE | 102013213569 A1 * | 1/2015 | ........... | H02K 49/102 |
| EP | 3118972 A1 * | 1/2017 | ........... | H02K 49/102 |

(Continued)

OTHER PUBLICATIONS

Kikuchi, Machine Translation of JP2014223189, Dec. 2014.*

(Continued)

*Primary Examiner* — Quyen P Leung
*Assistant Examiner* — Eric Johnson
(74) *Attorney, Agent, or Firm* — Cantor Colburn LLP

(57) ABSTRACT

The disclosure provides a pole-piece structure for a magnetic gear, comprising a plurality of laminate plates, wherein each plate is a metallic ring having a plurality of regularly spaced substantially solid portions joined by hollow connecting portions 104, wherein each plate is connected to an adjacent plate by a connecting means that is formed from or uses the material of the plates, such that the laminate plates form a mono-structure held together by the material of the plates.

13 Claims, 7 Drawing Sheets

(56) References Cited

FOREIGN PATENT DOCUMENTS

JP           2014233189 A  * 12/2014
WO        2011036552 A1     3/2011

OTHER PUBLICATIONS

Extended European Search Report or the partial European Search Report/declaration of no search and the European search opinion of the European Patent Office for International Application No. 15275167.3, Feb. 11, 2016, 9 pages.

* cited by examiner

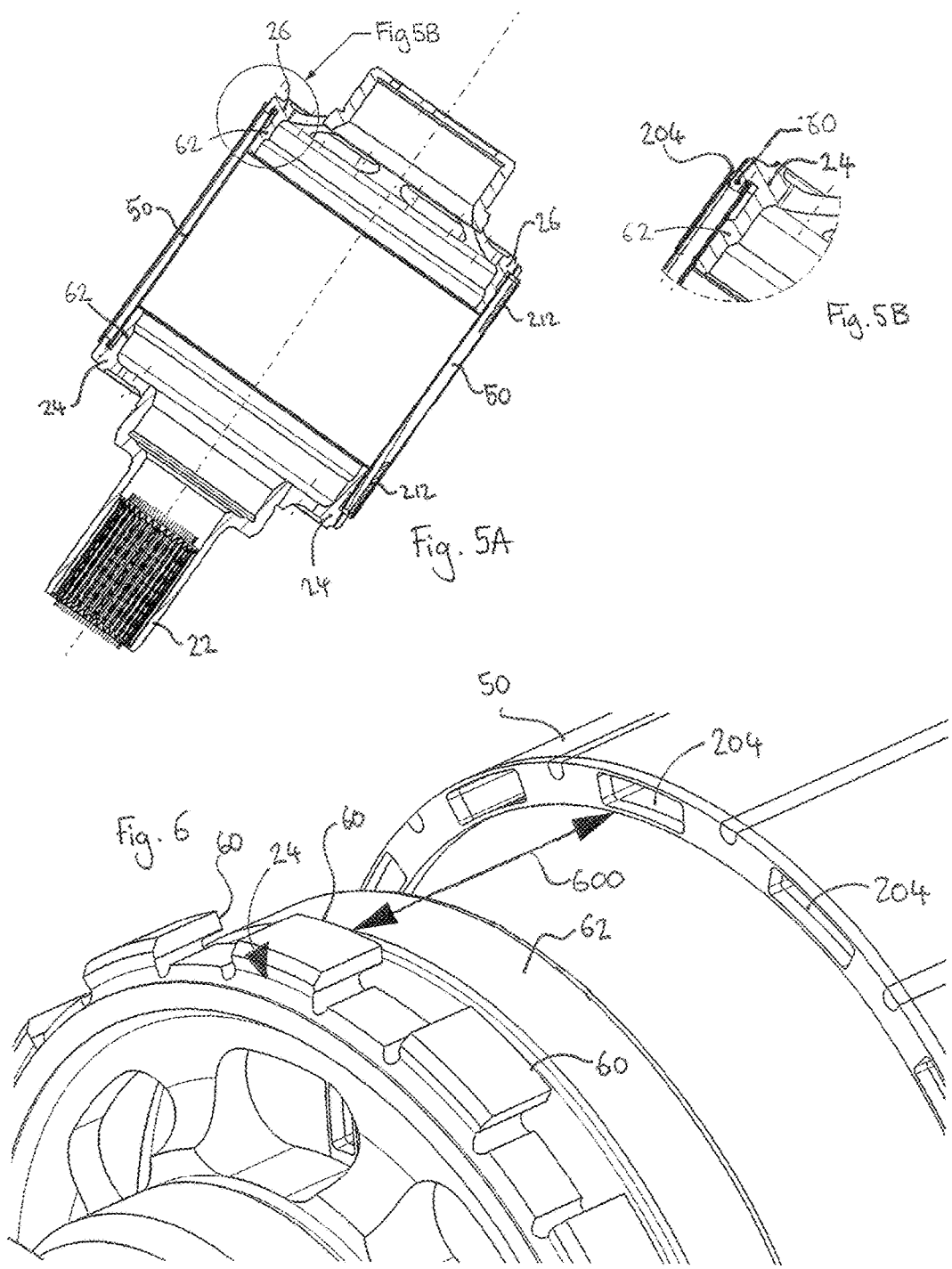

US 10,530,233 B2

POLE-PIECE STRUCTURE FOR A MAGNETIC GEAR

CROSS REFERENCE TO RELATED APPLICATIONS

This application is a Counterpart Application of European Patent Application No. 15275167.3 filed on Jul. 1, 2015, the contents of which are incorporated herein by reference in their entirety.

BACKGROUND

The present disclosure relates generally to a pole-piece structure for a magnetic gear, and methods of manufacturing same.

Magnetic gears are known and typically involve a concentric array of annular components that rotate relative to one another in order to rotate an output shaft at a different speed to an input shaft.

In one type of configuration, an inner permanent magnet can form an inner rotor and an outer permanent magnet can form an outer stator. A rotational pole-piece structure can be located between the inner and outer permanent magnets in order to provide a concentration of magnetic lines of force therebetween, and modulate the magnetic field so as to produce a gearing between the input and output shafts. The pole-piece structure forms a torque path between the input and output shafts without any mechanical contact. It is possible to vary the arrangement such that the pole-piece is a stator, and the two sets of permanent magnets rotate.

The gear ratio may be equal to the number of magnetic pole pairs on the permanent magnet associated with the high speed shaft, as compared to the number of magnetic pole pairs on the permanent magnet associated with the low speed shaft. This implies an even number of permanent magnets associated with each shaft.

Magnetic gears have known advantages in that, although bearings are required to mount the shafts in the gear assembly, the coupling between the moving parts is otherwise frictionless.

Pole-pieces, or "modulators" may be formed from laminate plates. Typically these are held together by a chassis or sub-carriage that extends through air gaps in the pole-piece. It is desired to provide improvements to the mounting of the pole-piece to the high or low speed shaft, or to the housing.

SUMMARY

In accordance with an aspect of the disclosure, there is provided a pole-piece structure for magnetic gear. The pole piece structure includes a plurality of laminate plates, wherein each plate is or comprises a ring having a plurality of regularly spaced substantially solid portions joined by hollow connecting portions. Each plate is connected to an adjacent plate by a connecting means that is formed from, uses or is part of the material of the plates, such that the laminate plates form a mono-structure held together by the material of the plates.

In accordance with the broadest aspects of the disclosure, each plate is connected to an adjacent plate by a connecting means that is formed from or uses the material of the plates. As such, no further components are required to connect and stack the plates together to form the pole-piece structure. Such extra components have been found to be detrimental to the pole-piece structure, for example negatively affecting the ability of it to transfer torque between input and output shafts of a magnetic gear. Providing the pole-piece structure in the form of a mono-structure held together by the material of the plates overcomes such problems.

By "mono-structure", it is meant that the modulator is formed as a single unit using the plates and connecting means. The mono-structure may be formed from substantially only the material of the plates. The plates may each be formed from the same material, e.g. silicon-iron, and optionally as a single-piece of material. No other components (except for the plates and connecting means, and/or the material of the plates) may be required to hold the sack of laminate plates together as a single unit, or "mono-structure" as defined herein.

The substantially solid portions may form magnetic poles in the pole-piece structure that may be regularly spaced around its circumference.

When stacked together to form the pole-piece structure, the solid portions of the laminate plates may align to form magnetic portions and/or poles of the modulator.

When stacked together to form the pole-piece structure, the hollow connecting portions of the laminate plates may align to form substantially non-magnetic portions of the modulator. For example, the hollow connecting portions of the laminate plates may align to form a plurality of air gaps that extend substantially along the entire length of the pole-piece structure.

Each plate may be in the form of an O-ring comprising the regularly spaced substantially solid portions joined by hollow connecting portions. In this manner the pole-piece structure forms a cylinder when the plates are stacked together.

In a first embodiment of the pole-piece structure, the connecting means may comprise one or more weld lines or beads extending across an outer surface of the stack of laminate plates, such that the laminate plates may form a mono-structure held together by the one or more weld lines or beads.

The weld lines or beads may extend in a direction parallel or substantially parallel to the longitudinal axis of the pole-piece structure. The connecting means may comprise at least 2, 3, 4 or 5 weld lines or beads. The weld lines or beads may comprise or be continuous weld lines or beads that extend along the entire length of the stack of plates.

The weld lines or beads may be formed without the use of a filler material, for example by an electron beam welding process.

In a second embodiment of the pole piece structure the connecting means may comprise one or more protrusions that are received within one or more cooperating recesses in an adjacent plate in a press, interference or snap fit arrangement such that the laminate plates may form a mono-structure held together by the press, interference or snap fit arrangement of the cooperating protrusions and recesses.

The protrusions may be pressed into the plates at common locations on the plates. The protrusions could be formed by pressing the plates in the required locations, which pressing may also form a corresponding recess on the opposite side of the plate to the protrusion.

The protrusions and recesses may have a common axis along the length of the pole-piece structure.

The protrusions and recesses may be located on each plate in the substantially solid portions of the plate. Each substantially solid portion may comprise a protrusion and recess. Each plate may comprise at least 2, 4, 6, 10 or 14 protrusions and recesses.

In any of the aspects or embodiments disclosed herein, the pole-piece structure may consist of the plurality of laminate plates and the connecting means. The connecting means may only use the material of the plates.

The plates may be stacked such that the solid portions align so as to form a plurality of magnetic pole-pieces in the pole-piece structure.

The plates may be stacked such that the hollow portions align so as to form a plurality of substantially non-magnetic portions, for example air gaps in the pole-piece structure.

The plates may each be formed from a single piece of material.

In accordance with an aspect of the disclosure, there is provided a magnetic gear assembly comprising: a pole-piece structure as described above; a plurality of inner permanent magnets; and a plurality of outer permanent magnets located concentrically with respect to the inner permanent magnets. In this assembly the pole-piece structure is located between the inner and outer permanent magnets and modulates the magnetic fields produced by the inner and outer permanent magnets.

The magnetic gear assembly may comprise an input shaft. The input shaft may be connected to and/or house the plurality of inner permanent magnets, the plurality of outer permanent magnets or the pole-piece structure.

The magnetic gear assembly may comprise an output shaft. The output shaft may be connected to and/or house the plurality of inner permanent magnets, the plurality of outer permanent magnets or the pole-piece structure.

The magnetic gear assembly may comprise a stationary housing. The stationary housing may be connected to and/or house the plurality of inner permanent magnets, the plurality of outer permanent magnets or the pole-piece structure.

The input or output shaft may form a low-speed rotor of the magnetic gear assembly. The input or output shaft may form a high-speed rotor of the magnetic gear assembly.

The input shaft, output shaft or housing may comprise features, for example lips or extensions, that cooperate with and/or extend into air gaps in the modulator in order to hold the modulator in position. If the modulator is attached to the input or output shaft in this manner, this may ensure that the modulator can slide into the lips or extensions and rotate with the input or output shaft without the need for e.g. bolts or clamps. Other attachment means can be used, such as bolts or clamps, however, in accordance with various embodiments.

In accordance with an aspect of the disclosure, there is provided a method of forming a pole-piece structure, comprising: stacking together a plurality of laminate plates, wherein each plate is a metallic ring having a plurality of regularly spaced substantially solid portions joined by hollow connecting portions; and welding one or more weld lines or beads across an outer surface of the stack of laminate plates to permanently connect the plates, such that the laminate plates form a mono-structure held together by the one or more weld lines or beads.

The weld lines or beads may be formed without the use of a filler material, for example by an electron beam welding process.

In accordance with an aspect of the disclosure, there is provided a method of forming a pole-piece structure, comprising: forming a plurality of laminate plates such that each plate comprises one or more protrusions configured to extend into one or more cooperating recesses in an adjacent plate in a press, interference or snap fit arrangement; and stacking together and/or connecting the plates such that the protrusions are received within the cooperating recesses, such that the laminate plates form a mono-structure held together by the press, interference or snap fit arrangement of the cooperating protrusions and recesses.

The one or more protrusions may be formed by pressing the plates in the required locations, which pressing may also form one or more corresponding recesses on the opposite side of the plate to the one or more protrusions.

BRIEF DESCRIPTION OF THE DRAWINGS

Various embodiments will now be described, by way of example only, and with reference to the accompanying drawings in which:

FIG. 5A shows a cross-section through part of the magnetic pole-piece structure of FIG. 4;

FIG. 5B shows a close up of part of FIG. 5A;

FIG. 6 shows a perspective view of a connection between two parts of the pole-piece structure of FIG. 4;

DETAILED DESCRIPTION

The disclosure relates generally to a pole piece structure (or "modulator") for use in, e.g. a magnetic gear or a magnetic gear assembly, and methods of manufacturing a pole-piece structure (or "modulator").

Figure 1:
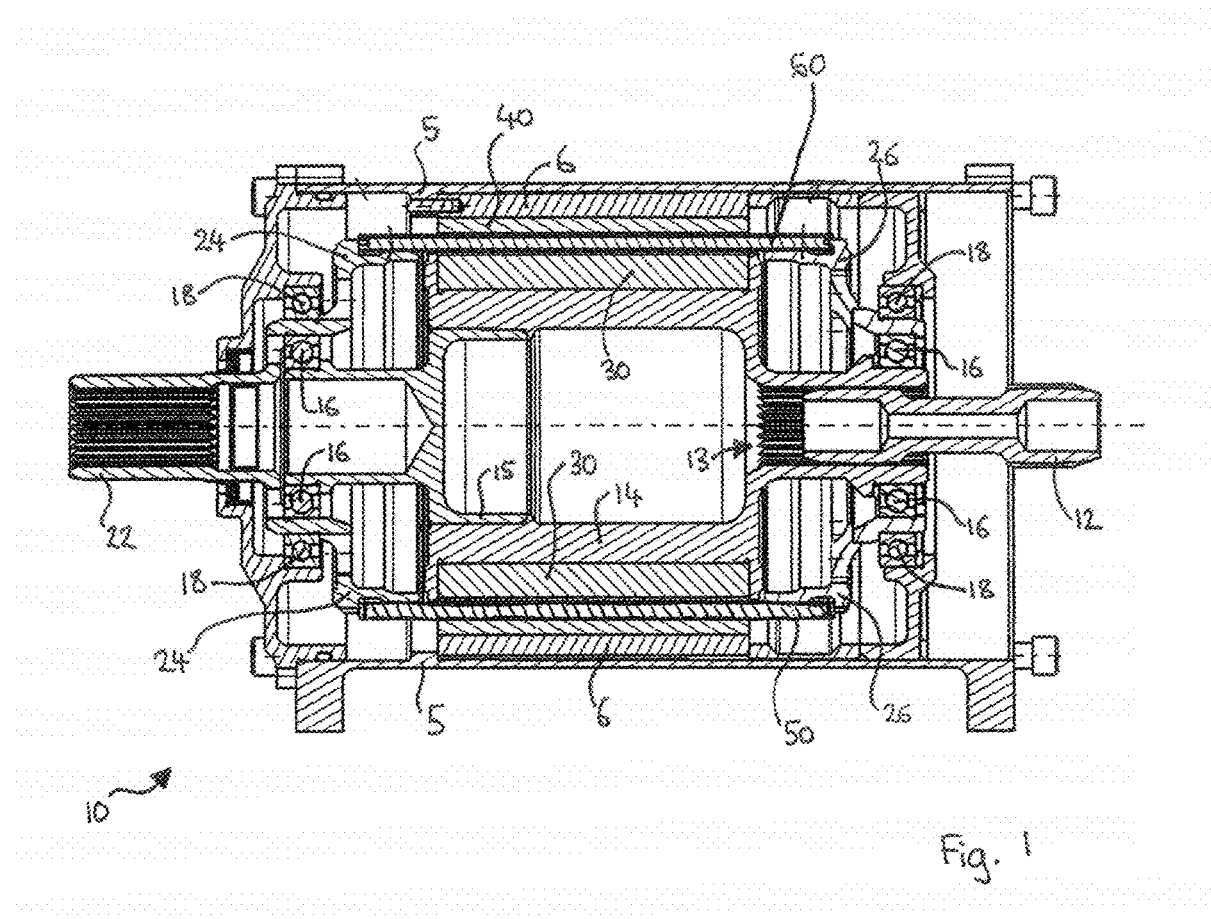
FIG. 1 shows an axial cross-section through a magnetic gear assembly.

FIG. 1 shows a magnetic gear assembly 10 in accordance with an embodiment.

The magnetic gear assembly 10 comprises a housing 5, as well as an input shaft 12 and an output shaft 22. The input shaft 12 connects to an inner rotor 14 via, e.g. a spline connection 13, and the inner rotor 14 connects to an inner rotor support 15. The inner rotor 14 and inner rotor support 15 rotate together and are supported by inner bearings 16. The inner rotor 14 and inner rotor support 15 and/or the input shaft 12 could be a single-piece component.

The inner rotor 14 supports an array of inner permanent magnets 30 that rotate together with the input shaft 12 and inner rotor 14.

The housing 5 is fixed in relation to the moving parts of the magnetic gear assembly 10, and supports an array of outer permanent magnets 40. The outer permanent magnets 40 are fixed to the housing 5 via an outer support 6.

A pole piece structure or modulator 50 is located between the outer permanent magnets 40 and the inner permanent magnets 30. The modulator 50 is carried by an extension 24 of the output shaft 22 and a modulator support 26. The extension 24 and modulator support 26 are carried by inner bearings 16 and outer bearings 18 and, with the modulator 50, are rotatable with the output shaft 22.

The modulator 50 is made of a magnetic material and acts to modulate the magnetic fields produced by the inner and outer permanent magnets. To do this, the modulator 50 comprises a number of magnetic poles that are regularly spaced around its circumference, which provide flux harmonics corresponding to the magnet pole pairs on the inner and outer permanent magnets. This causes the components to interact in a magnetically-geared manner. The modulator 50 may form a torque path between the input shaft 12 and the output shaft 22 without any mechanical contact. Such theory is known in the art and will not be repeated herein.

In the illustrated embodiment, the outer permanent magnets 40 do not rotate, although other embodiments are contemplated in which the outer permanent magnets 40 rotate and the pole-piece structure 50 is fixed. Also, in the illustrated embodiment the input shaft 12 and inner rotor 14 is configured as a high-speed rotor and the modulator 50 and output shaft 22 are configured as the low-speed rotor. This is due to the lower number of inner permanent magnets 30 when compared to the number of outer permanent magnets 40. However, other embodiments are contemplated in which the inner rotor 14 is configured as the low-speed rotor, by using a higher number of inner permanent magnets than outer permanent magnets.

Figure 2:
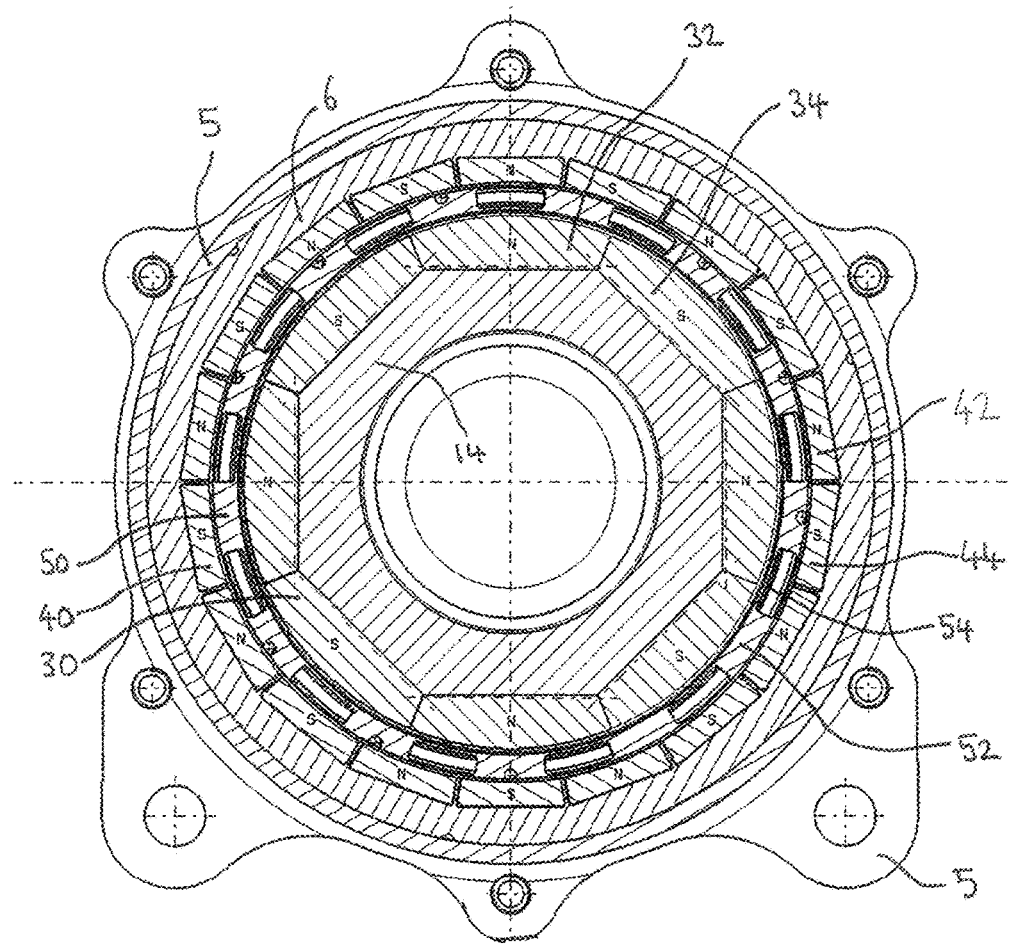
FIG. 2 shows a radial cross-section through the magnetic gear assembly shown in FIG. 1.

FIG. 2 shows a radial cross-section through the magnetic gear assembly 10.

The inner rotor 14 supports the inner permanent magnets 30. In the illustrated embodiment, eight inner permanent magnets are used but any number can be used as required. The inner permanent magnets are arranged in alternating north 32 and south 34 poles. Similarly, the outer permanent magnets 40 comprise alternating north 42 and south 44 poles. Eighteen alternating poles are used in the illustrated embodiment, although any number can be used as required.

The modulator 50 comprises an array of regularly spaced magnetic portions 52 and substantially non-magnetic portions 54, which are arranged in an alternating pattern. The magnetic portions 52 may be a solid piece of a magnetic metal, and the substantially non-magnetic portions 54 may comprise an air gap. These are described in more detail below. As illustrated, the number of magnetic and non-magnetic parts is chosen to be twenty-six, i.e. the sum of the inner and outer permanent magnets, although any number can be used as required.

A nominal air gap (not shown) is present between the modulator 50 and each of the inner and outer arrays of permanent magnets 30, 40. This means that torque is transferred between the rotating magnetic parts of the magnetic gear assembly 10 in a frictionless manner.

The pole-piece structure or modulator 50 is formed from a plurality of laminate plates 100 that are stacked together. The plates may be formed from or comprise silicon-iron.

Figure 3A:
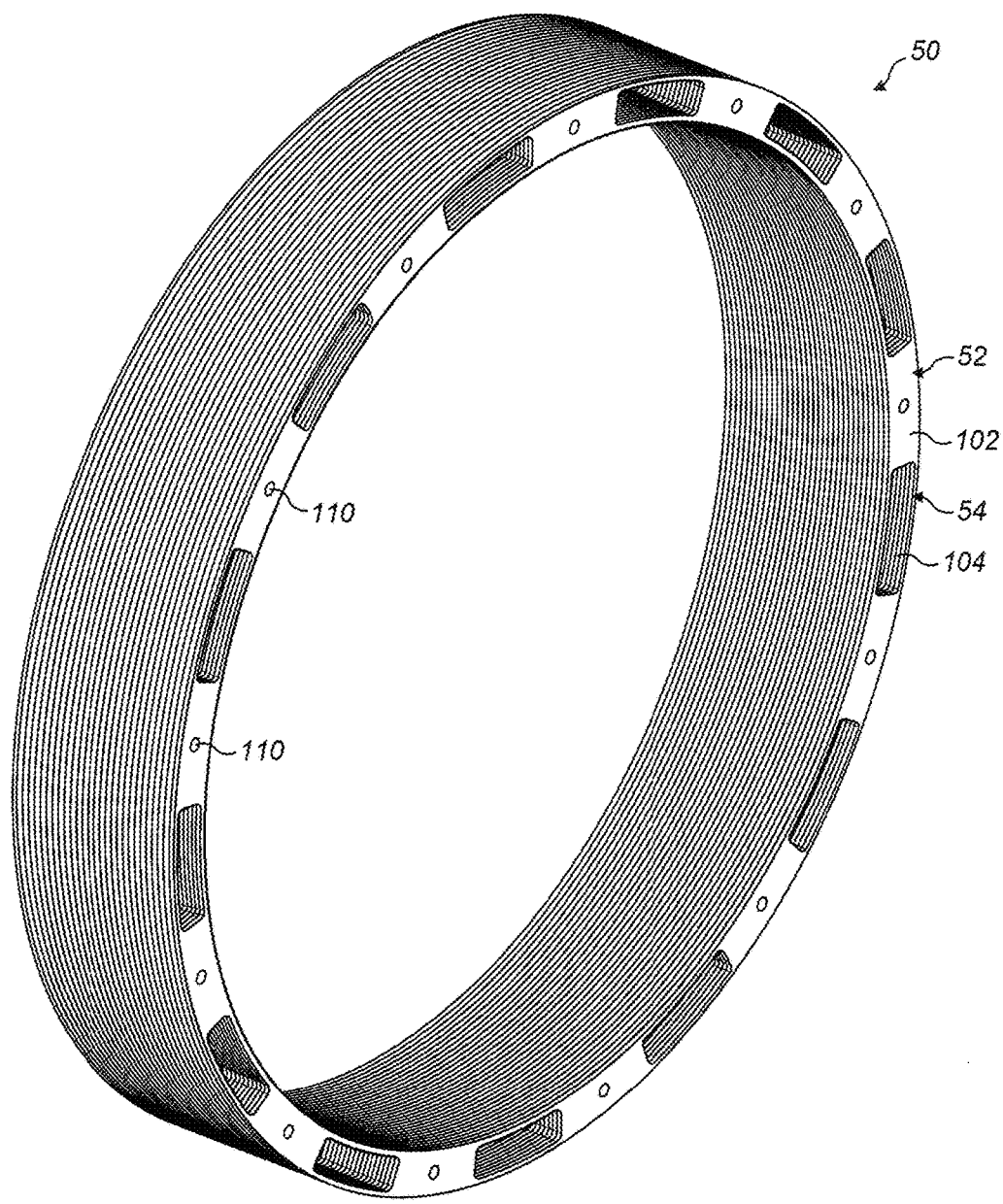
FIG. 3A shows a perspective view of an embodiment of a pole-piece structure for use in the magnetic gear assembly of FIG. 1.
Figure 3B:
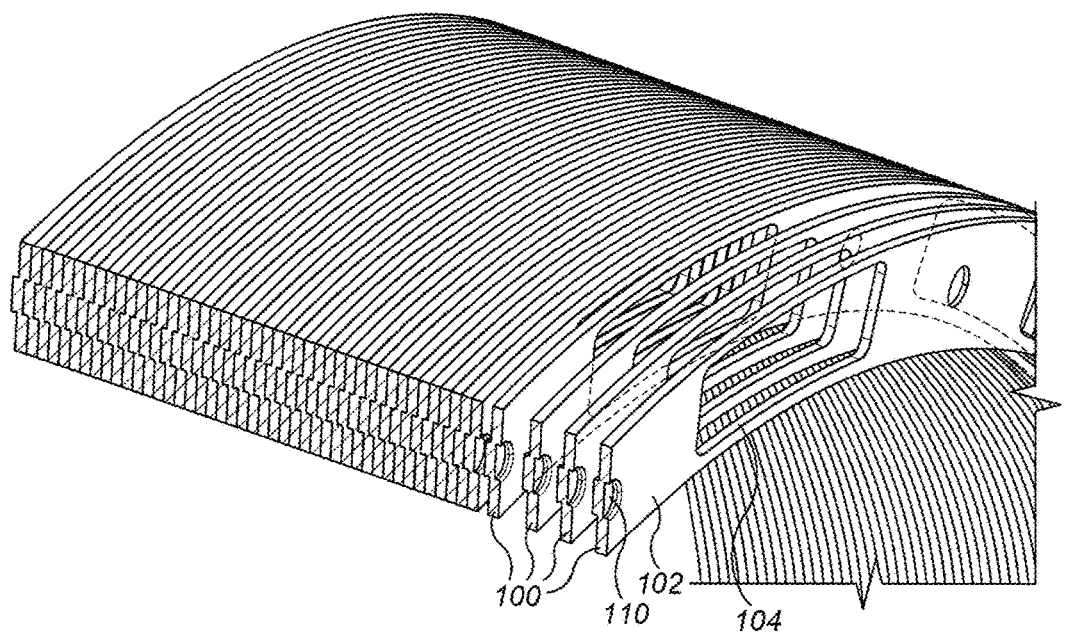
FIG. 3B shows an exploded view of the pole-piece structure of FIG. 3A.
Figure 3C:
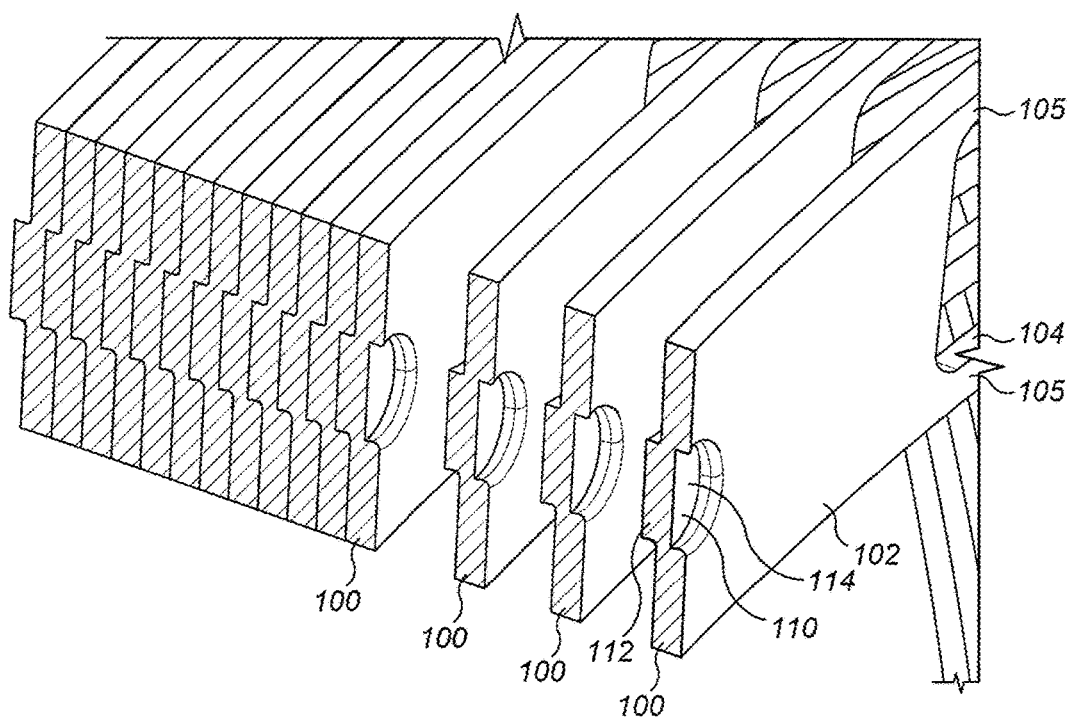
FIG. 3C shows a close up of the exploded view of FIG. 3B.

As shown in FIGS. 3A-3C, each plate 100 may comprise a ring having a plurality of regularly spaced and solid portions 102 that are separated by hollow connecting portions 104. The connecting portions 104 comprise one or more connectors 105 (FIG. 3C) to connect the solid portions 102 together. In the illustrated embodiment, two narrow connectors 105 are provided for each hollow portion 104, although a single connector, or more than two connectors may be used as appropriate. Optionally, each plate 100 is a single-piece of magnetic metal.

When stacked together, the solid portions 102 of the laminate plates 100 align and form the magnetic portions 52 of the modulator 50. Similarly, when stacked together the hollow connecting portions 104 of the laminate plates 100 align to form the substantially non-magnetic portions 54 of the modulator 50. The word "substantially" is used to indicate that the hollow portions still comprise metal (e.g. magnetic) connectors 105, but are mainly void between the connectors 105 to provide a non-magnetic air gap.

In accordance with the disclosure, each plate 100 is connected to an adjacent plate by a connecting means that is formed from or uses the material of the plates 100. As such, no further components are required to connect and stack the plates 100 together to form the modulator 50. Such extra components have been found to affect either the magnetic portions 52 or the non-magnetic portions 54 of the modulator 50.

For example, some conventional arrangements use a chassis or sub-carriage to carry the modulator. Such arrangements may have included bolts extending through the modulator to hold it together, or a bonding material such as a glue. It has been found that this type of architecture can compromise both the solid magnetic portions as well as the air gap, leading to losses in performance and efficiency. The broadest aspects of the present disclosure overcome this by using a connecting means that is formed from, uses or is part of the material of the plate.

The embodiment of FIGS. 3A-3C provides a plurality of features 110 on each plate 100 that cooperate to provide a press fit connection between adjacent plates. More specifically, part of the solid portion 102 of each plate 100 is machined or otherwise processed such that a projection 112 is formed on one side of each plate 100, and a recess 114 is formed on the opposing side of each plate 100. As such, each projection 112 located on a given plate cooperates with a recess 114 located on an adjacent plate. The protrusions could be formed by pressing the plates in the required locations, which pressing may also form a corresponding recess on the opposite side of the plate to the protrusion.

In the illustrated embodiment the projections 112 and recesses 114 have substantially similar diameters, such that a press fit is formed between the projections 112 and recesses 114 when the plates are stacked together. In other embodiments, the cooperating features provide a snap or interference fit.

As will be appreciated, the features necessary to hold the plates 100 together in a stack to form the modulator 50 are formed from or use only the material of the plates 100. The modulator 50 will be held together adequately by the cooperating features, and can form a strong mono-structure without the need for further components to hold the plates 100 together in the stack.

By "mono-structure", it is meant that the modulator 50 is formed as a single unit using the plates and connecting means. The mono-structure may be formed from substantially only the material of the plates 100. This may be the case if the plates 100 are each formed from the same material, e.g. silicon-iron, and optionally as a single-piece of material. No other components may be required to hold the stack of laminate plates together.

Figure 4:
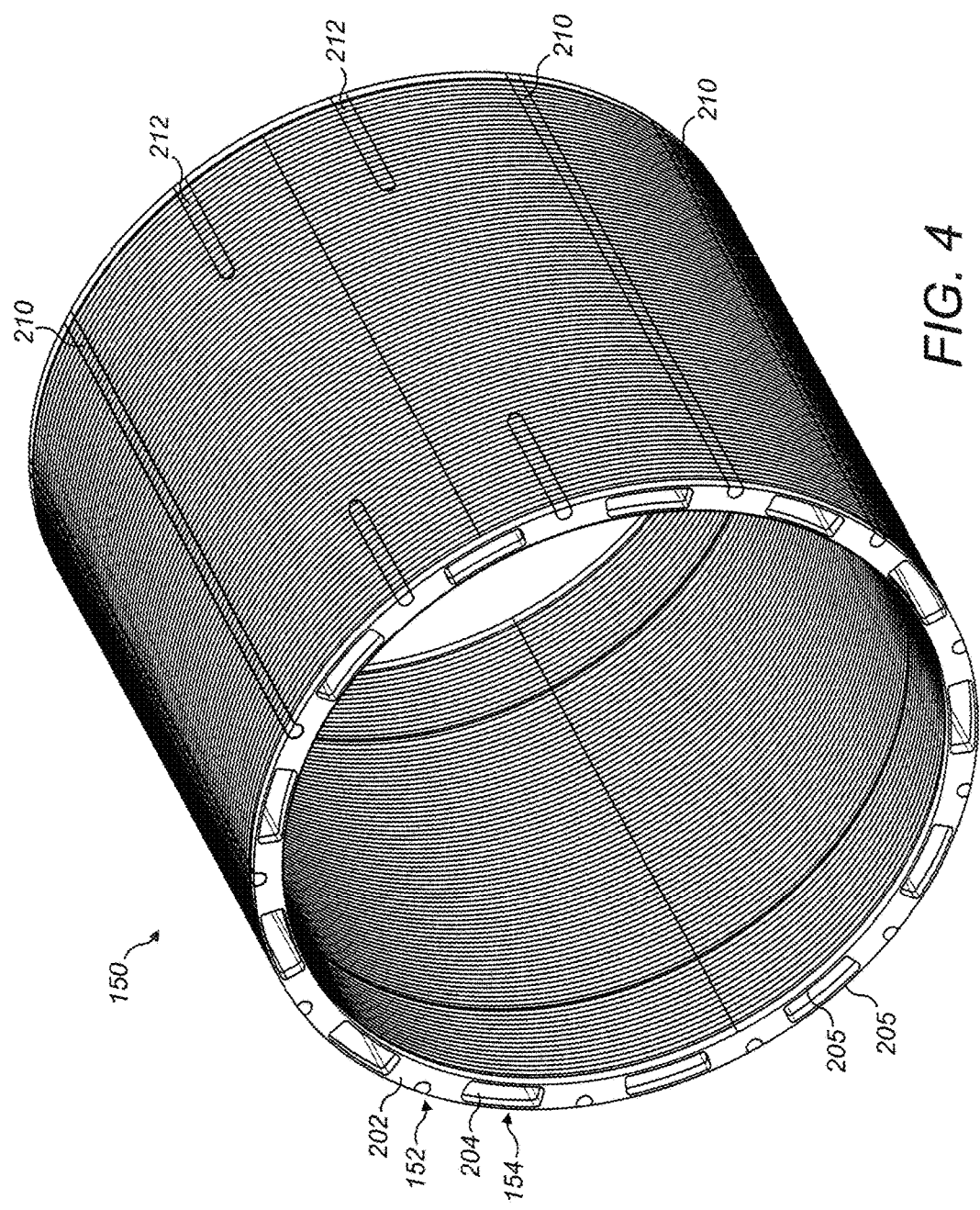
FIG. 4 shows a perspective view of part of a pole-piece structure for use in the magnetic gear assembly of FIG. 1.

A further embodiments is shown in FIG. 4, in which a pole-piece structure or modulator 150 is formed from a plurality of laminate plates 200 that are stacked together. Except for the means of connecting the plates 200 together, the modulator 150 of FIG. 4 has the same features as that of the modulator 50 of FIGS. 3A-3C and can be used in the magnetic gear assembly 10 in the same manner. As such, like features have been given similar reference numerals but with '100' added. The plates 200 may be formed from or comprise silicon-iron.

Each plate 200 may comprise a ring having a plurality of regularly spaced and solid portions 202 that are separated by hollow connecting portions 204. The connecting portions 204 comprise one or more connectors 205 to connect the solid portions 202 together. In the illustrated embodiment, two narrow connectors 205 are provided for each hollow portion 204, although a single connector, or more than two connectors may be used as appropriate. Optionally, each plate 200 is a single-piece of magnetic metal.

When stacked together, the solid portions 202 of the laminate plates 200 align and form the magnetic portions 152 of the modulator 150. Similarly, when stacked the hollow connecting portions 204 of the laminate plates align to form the substantially non-magnetic portions 154 of the modulator 150. The word "substantially" is used to indicate that the hollow portions still comprise metal (e.g. magnetic) connectors 205, but are mainly void between the connectors 205 to provide a non-magnetic air gap.

In accordance with the disclosure, each plate 100 is connected to an adjacent plate by a connecting means that is formed from or uses the material of the plates 100. In this embodiment the connecting means comprises one or more weld lines or beads 210, 212 extending across an outer surface of the stack of laminate plates 100. In this manner, the laminate plates 100 form a mono-structure held together by said one or more weld lines or beads 210, 212.

The welding method is optionally electron beam welding. This method of welding does not typically require a weld filler and advantageously the only material used in the welding process is that of the plates. However, other types of welding are possible and the use of a filler would not depart from the broadest aspects of the disclosure since each plate 200 would still be connected to an adjacent plate using the material of the plates 200, even if a filler is also present in the connection.

In the illustrated embodiment, a plurality of continuous weld lines 210 are made along the entire longitudinal length of the stack of plates 200. Further weld lines 212 are made that extend partially into the stack of plates. Any number of weld lines may be provided. The weld lines may be provided in any configuration or orientation such that each plate is connected to an adjacent plate by a weld, such that all of the plates may be held together by the weld lines. In this manner, the modulator 600 forms a mono-structure as defined above. Even if a weld filler is present, the modulator 600 may still be formed from substantially one material, namely that of the plates 200.

FIG. 5A shows a cross-section through the output shaft 22, extension 24, modulator support 26 and modulator 50 of the FIG. 4 embodiment of the pole-piece structure 10. For clarity, other components of the pole-piece structure 10 are not shown. FIG. 5B shows a close-up of part of FIG. 5A.

It can be seen from FIGS. 5A and 5B that the modulator 50 is connected to the output shaft 22 using a plurality of lips 60 that extend into respective hollow portions 204 of the modulator. The extension 24 and modulator support 26 also comprise respective annular platforms 62 that support an inner surface of the modulator 50.

FIG. 6 shows a perspective view of the components shown in FIG. 5 prior to their assembly. As will be appreciated, the modulator 50 and extension 24 are moved towards one another in the direction of arrow 600, and the lips 60 slot into respective hollow portions 204 of the modulator 50 to secure the modulator 50 to the output shaft 22. The platform 62 slides underneath the modulator 50 whilst maintaining contact to provide its function of supporting the modulator 50 in use. The same procedure is used to insert the modulator support 26 into the modulator 50.

Figure 7:
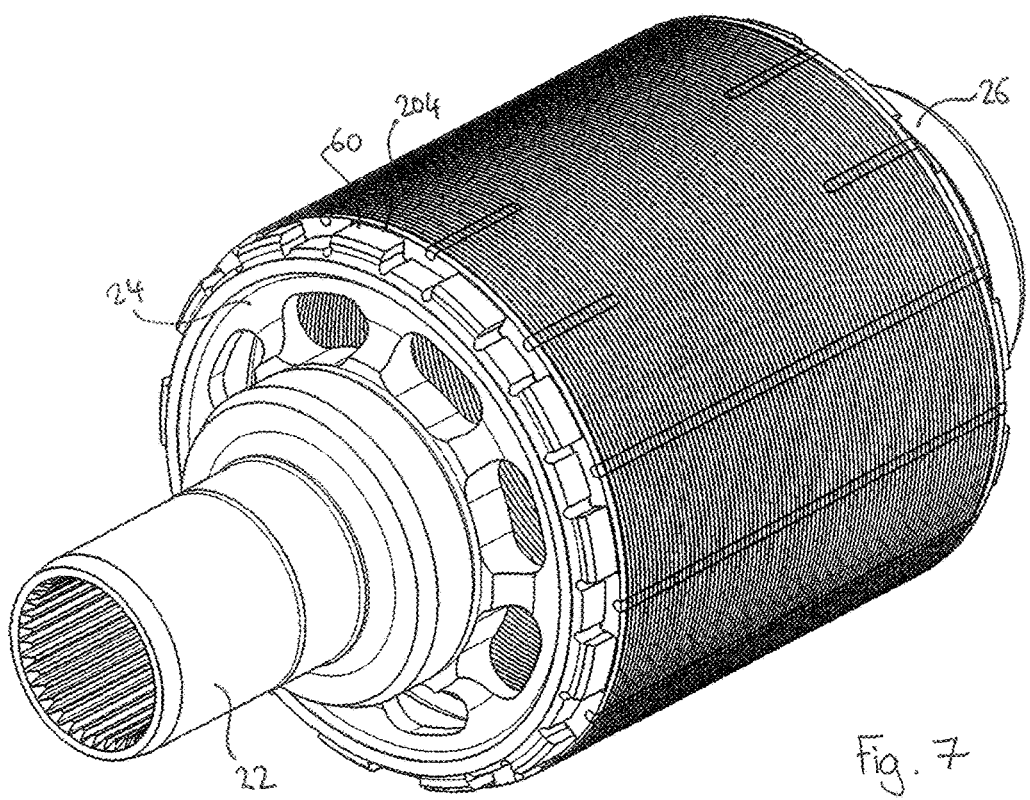
FIG. 7 shows a perspective view of part of the pole-piece structure of FIG. 4.

FIG. 7 shows the modulator 50 connected to and assembled with the output shaft 22, extension 24 and modulator support 26. It can be seen that the lips 60 extend into respective hollow portions of the modulator 50 as discussed above.

The same attachment means of lips and annular platforms can be used with the embodiment of FIGS. 3A-3C, and any other aspects or embodiments of the present disclosure. Other means of attaching the modulator could be used, such as clamps.

Although the present disclosure has been described with reference to preferred embodiments, it will be understood by those skilled in the art that various changes in form and detail may be made without departing from the scope of the accompanying claims.

The invention claimed is:

1. A magnetic gear assembly comprising: a pole-piece structure comprising a plurality of laminate plates, wherein each plate comprises a ring having a plurality of regularly spaced substantially solid portions joined by hollow connecting portions, the hollow connecting portions comprising one or more connectors to connect the solid portions together;
   a plurality of inner permanent magnets; and
   a plurality of outer permanent magnets located concentrically with respect to said inner permanent magnets;
      wherein said pole-piece structure is located between said inner and outer permanent magnets and modulates the magnetic fields produced by said inner and outer permanent magnets,
   wherein each plate is connected to an adjacent plate by a connecting means that is formed from or uses the material of the plates, such that the laminate plates form a monostructure held together solely by the material of the plates,
   wherein said plates are stacked such that said hollow connecting portions align to form substantially non-magnetic portions of the pole-piece structure, wherein for at least some of said plates the hollow connecting portions are completely void between the solid portions and any connectors so as to provide a plurality of air gaps in said pole-piece structure when said pole-piece structure is positioned within the magnetic gear assembly,
   wherein the pole-piece structure is held within the magnetic gear assembly using lips that slot into respective hollow connecting portions of the pole-piece structure at either end thereof, and the hollow connecting portions are completely void between the lips.

2. A magnetic gear assembly as claimed in claim 1, wherein said connecting means comprises one or more weld lines or beads extending across an outer surface of the stack of laminate plates, such that the laminate plates form a mono-structure held together by said one or more weld lines or beads.

3. A magnetic gear assembly as claimed in claim 2, wherein said weld lines or beads extend in a direction parallel or substantially parallel to the longitudinal axis of said pole-piece structure.

4. A magnetic gear assembly as claimed in claim 2, wherein said weld lines or beads are formed without the use of a filler material, for example by an electron beam welding process.

5. A magnetic gear assembly as claimed in claim 1, wherein said connecting means comprises one or more protrusions that are received within one or more cooperating recesses in an adjacent plate in a press, interference or snap fit arrangement such that the laminate plates form a monostructure held together by said press, interference or snap fit arrangement of said cooperating protrusions and recesses.

6. A magnetic gear assembly as claimed in claim 5, wherein said protrusions are pressed into said plates at common locations on said plates.

7. A magnetic gear assembly as claimed in claim 5, wherein said protrusions and recesses have a common axis along the length of said pole-piece structure.

8. A magnetic gear assembly as claimed in claim 5, wherein said protrusions and recesses are located on each plate in the substantially solid portions of said plate.

9. A magnetic gear assembly as claimed in claim 1, wherein said pole-piece structure consists of said plurality of laminate plates and said connecting means.

10. A magnetic gear assembly as claimed in claim 1, wherein said plates are stacked such that said solid portions align so as to form a plurality of magnetic pole-pieces in said pole-piece structure.

11. A magnetic gear assembly as claimed in claim 1, wherein said plates are each formed from a single piece of material.

12. A method of forming a magnetic gear assembly, comprising:
forming a pole-piece structure by:
stacking together a plurality of laminate plates, wherein each plate is a metallic ring having a plurality of regularly spaced substantially solid portions joined by hollow connecting portions, the hollow connecting portions comprising one or more connectors to connect the solid portions together; and
welding one or more weld lines or beads across an outer surface of the stack of laminate plates to permanently connect said plates, such that the laminate plates form a mono-structure held together solely by said one or more weld lines or beads;
wherein said plates are stacked such that said hollow connecting portions align to form substantially non-magnetic portions of the pole-piece structure, wherein for at least some of said plates the hollow connecting portions are completely void between the solid portions and any connectors so as to provide a plurality of air gaps in said pole-piece structure when said pole-piece structure is positioned within the magnetic gear assembly; and
inserting lips into either end of respective hollow connecting portions of the pole-piece structure to hold the pole-piece structure within the magnetic gear assembly between a plurality of inner permanent magnets and a plurality of outer permanent magnets, wherein after the inserting the hollow connecting portions are completely void between the lips.

13. A method of forming a magnetic gear assembly comprising:
forming a pole-piece structure by:
forming a plurality of laminate plates wherein each plate is a metallic ring having a plurality of regularly spaced substantially solid portions joined by hollow connecting portions, the hollow connecting portions comprising one or more connectors to connect the solid portions together, and each plate comprises one or more protrusions configured to extend into one or more cooperating recesses in an adjacent plate in a press, interference or snap fit arrangement; and
stacking together and/or connecting said plates such that said protrusions are received within said cooperating recesses, such that the laminate plates form a mono-structure held together solely by said press, interference or snap fit arrangement of said cooperating protrusions and recesses;
wherein said plates are stacked such that said hollow connecting portions align to form substantially non-magnetic portions of the pole-piece structure, wherein for at least some of said plates the hollow connecting portions are completely void between the solid portions and any connectors so as to provide a plurality of air gaps in said pole-piece structure when said pole-piece structure is positioned within the magnetic gear assembly; and
inserting lips into either end of respective hollow connecting portions of the pole-piece structure to hold the pole-piece structure within the magnetic gear assembly between a plurality of inner permanent magnets and a plurality of outer permanent magnets, wherein after the inserting the hollow portions are completely void between the lips.

* * * * *